United States Patent
Shi et al.

(10) Patent No.: US 8,200,736 B2
(45) Date of Patent: Jun. 12, 2012

(54) VIRTUAL SIM CARD FOR MOBILE HANDSETS

(75) Inventors: Guangming Shi, San Diego, CA (US); Venkat Tangirala, San Diego, CA (US); Julian Durand, San Diego, CA (US); Ajay Dudani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 844 days.

(21) Appl. No.: 11/963,918

(22) Filed: Dec. 24, 2007

(65) Prior Publication Data

US 2009/0163175 A1 Jun. 25, 2009

(51) Int. Cl.
*G06F 15/16* (2006.01)
(52) U.S. Cl. .................................. 709/200; 709/229
(58) Field of Classification Search .......... 709/217–219, 709/200, 229
See application file for complete search history.

(56) References Cited

U.S. PATENT DOCUMENTS

| | | | |
|---|---|---|---|
| 5,428,666 A | 6/1995 | Fyfe et al. | |
| 5,763,862 A | 6/1998 | Jachimowicz et al. | |
| 5,987,325 A | 11/1999 | Tayloe | |
| 6,078,652 A | 6/2000 | Barak | |
| 6,490,679 B1 * | 12/2002 | Tumblin et al. | 713/155 |
| 6,526,272 B1 | 2/2003 | Bansal et al. | |
| 6,643,504 B1 | 11/2003 | Chow et al. | |
| 6,914,517 B2 | 7/2005 | Kinsella | |
| 7,039,221 B1 | 5/2006 | Tumey et al. | |
| 7,171,460 B2 * | 1/2007 | Kalavade et al. | 709/223 |
| 7,185,161 B2 | 2/2007 | Kang | |
| 7,218,930 B2 | 5/2007 | Ko et al. | |
| 7,593,605 B2 | 9/2009 | King et al. | |
| 7,689,231 B2 | 3/2010 | Mardiks et al. | |
| 7,689,251 B2 | 3/2010 | Bae | |
| 7,738,891 B2 | 6/2010 | Tenhunen et al. | |
| 7,787,602 B2 | 8/2010 | Pearson et al. | |
| 2002/0072388 A1 | 6/2002 | Korneluk et al. | |
| 2002/0097855 A1 | 7/2002 | Neudeck et al. | |
| 2002/0103964 A1 | 8/2002 | Igari | |
| 2003/0046228 A1 | 3/2003 | Berney | |
| 2003/0083968 A1 | 5/2003 | Marsh et al. | |
| 2003/0191939 A1 * | 10/2003 | Tsai et al. | 713/168 |

(Continued)

FOREIGN PATENT DOCUMENTS

DE 29821644 2/1999

(Continued)

OTHER PUBLICATIONS

European Search Report—EP08102993—Search Authority—Munich—Apr. 14, 2009.

(Continued)

*Primary Examiner* — Hussein A. Elchanti
(74) *Attorney, Agent, or Firm* — James T. Hagler

(57) ABSTRACT

A system and method for providing a capability to backup cellular telephone provisioning information and personal data from a mobile handset on a server. A user initializes an account with a service provider with authentication credentials and backs up provisioning information and personal data stored within a mobile handset to server for safe keeping. The provisioning information and personal data can be accessed via the cellular telephone network so that the provisioning and personal data can be transferred among mobile handsets. This allows a user to restore personal data quickly and easily if a mobile handset replaced, lost or destroyed. The system and method further provide the capability to remotely provision new mobile handsets.

83 Claims, 10 Drawing Sheets

U.S. PATENT DOCUMENTS

| | | |
|---|---|---|
| 2004/0022216 A1 | 2/2004 | Shi |
| 2004/0024670 A1 | 2/2004 | Valenzuela et al. |
| 2004/0087305 A1 | 5/2004 | Jiang et al. |
| 2004/0249915 A1 | 12/2004 | Russell |
| 2005/0020250 A1* | 1/2005 | Chaddha et al. ........... 455/414.1 |
| 2005/0039027 A1 | 2/2005 | Shapiro |
| 2005/0101323 A1 | 5/2005 | De Beer |
| 2005/0124288 A1 | 6/2005 | Karmi et al. |
| 2005/0282554 A1 | 12/2005 | Shyy et al. |
| 2006/0068786 A1 | 3/2006 | Florence |
| 2006/0079237 A1 | 4/2006 | Liu et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |
| 2006/0218337 A1 | 9/2006 | Hashimoto |
| 2006/0234693 A1 | 10/2006 | Isidore et al. |
| 2006/0282554 A1 | 12/2006 | Jiang et al. |
| 2006/0285538 A1 | 12/2006 | Oommen |
| 2006/0291455 A1* | 12/2006 | Katz et al. ..................... 370/355 |
| 2007/0060200 A1 | 3/2007 | Boris et al. |
| 2007/0094337 A1 | 4/2007 | Klassen et al. |
| 2007/0105531 A1 | 5/2007 | Schroeder, Jr. |
| 2007/0130156 A1 | 6/2007 | Tenhunen et al. |
| 2007/0149170 A1* | 6/2007 | Bloebaum et al. ............ 455/411 |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2008/0020755 A1 | 1/2008 | Liu et al. |
| 2008/0020773 A1 | 1/2008 | Black et al. |
| 2008/0028230 A1 | 1/2008 | Shatford |
| 2008/0051062 A1* | 2/2008 | Lee ................................ 455/411 |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0209545 A1 | 8/2008 | Asano |
| 2008/0254766 A1 | 10/2008 | Craven |
| 2008/0265024 A1 | 10/2008 | Tracy et al. |
| 2008/0289018 A1* | 11/2008 | Kawaguchi ....................... 726/9 |
| 2008/0290161 A1 | 11/2008 | Blake |
| 2008/0311912 A1 | 12/2008 | Balasubramanian et al. |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0061839 A1 | 3/2009 | Zimmerman et al. |
| 2009/0077643 A1 | 3/2009 | Schmidt et al. |
| 2009/0215449 A1 | 8/2009 | Avner |
| 2009/0227230 A1 | 9/2009 | Camilleri et al. |
| 2010/0005313 A1 | 1/2010 | Dai |
| 2010/0112997 A1 | 5/2010 | Roundtree |
| 2010/0167724 A1 | 7/2010 | Haran et al. |
| 2010/0234009 A1 | 9/2010 | Antani et al. |
| 2010/0248690 A1 | 9/2010 | Biggs et al. |
| 2010/0279653 A1 | 11/2010 | Poltorak |
| 2010/0291924 A1 | 11/2010 | Antrim et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0059738 A1 | 3/2011 | Waller |

FOREIGN PATENT DOCUMENTS

| | | |
|---|---|---|
| DE | 10146664 A1 | 2/2003 |
| EP | 1337119 A1 | 8/2003 |
| EP | 1696357 A1 | 8/2006 |
| EP | 1727383 A1 | 11/2006 |
| GB | 2313257 A | 11/1997 |
| GB | 2386803 A | 9/2003 |
| JP | 2003264631 | 9/2003 |
| WO | WO9219078 | 10/1992 |
| WO | WO9924938 | 5/1999 |
| WO | WO9946682 | 9/1999 |
| WO | WO0111577 | 2/2001 |
| WO | WO02067563 | 8/2002 |
| WO | WO03007639 A1 | 1/2003 |
| WO | WO2005029890 | 3/2005 |
| WO | WO2006094564 | 9/2006 |
| WO | WO2007143342 | 12/2007 |
| WO | WO2008040964 | 4/2008 |

OTHER PUBLICATIONS

International Search Report and Written Opinion—PCT/US2008/088320, International Search Authority—European Patent Office—Apr. 22, 2009.

* cited by examiner

VIRTUAL SIM CARD FOR MOBILE HANDSETS

FIELD OF INVENTION

The present invention relates to a system and method for remotely downloading cellular telephone provisioning information and personal data to a mobile handset.

BACKGROUND OF INVENTION

Presently, mobile handsets utilize a variety of technologies and formats which may include, for example, GSM (Global System for Mobile Communication), CDMA (Code Division Multiple Access) and/or UMTS (Universal Mobile Telecommunications System) technology depending on the carrier of choice. In order to store a user's personal data, GSM and UMTS mobile handsets utilize the Subscriber Identity Module (SIM), commonly known as a SIM card. The SIM card is a detachable smart card containing the user's cell phone provisioning or subscription information as well as a wealth of personal data, such as phonebooks, saved SMS messages, downloaded data, and personalization settings. Through the use of a SIM card, mobile handset users are able to retain their personal data information when upgrading handsets. Thus, GSM and UMTS mobile handset users can purchase newer model handsets or replace mobile handsets while easily retaining all of their important personal data. In this way, if users replace their mobile handset, so long as the SIM card is plugged into the replacement phone, the users will not have to re-enter all of their personal data. Also, because the SIM card contains the cellular network provisioning information, users can change carriers while retaining their mobile handsets simply by changing the SIM card. However, if GSM and UMTS mobile handset users lose their mobile handset along with the SIM card, they have lost their personal data and must reenter the data into a replacement handset While analogous device for other mobile network systems have been developed, such as Removable User Identity Module (RUIM), Universal Subscriber Identity Module (USIM) or Universal Integrated Circuit Card (UICC), these devices suffer from the same problems of personal data loss when the mobile handset containing these devices are lost or destroyed. Further, SIMs, RUIMs, USIMs, and UICCs are costly for operators and users and are not scalable and may not have sufficient capacity to store large amounts of user data and applications.

In addition, while some CDMA mobile handsets store provisioning information on a removable card that can be moved from handset to handset, many CDMA phones do not provide this capability. Thus, when these types of CDMA mobile handset are purchased from a carrier, the carrier must provision the mobile handset. Also, if CDMA mobile handset users wish to have a new mobile handset programmed with their personal data existing in a previous mobile handset, users must have the service provider download such information into the new phone. This process may be time consuming, inconvenient or costly.

Consequently, a system and method is desired to allow users to more easily retain and transfer personal data contained in the memory of mobile handsets.

SUMMARY

Various embodiments provide systems and methods for retaining and transferring personal data contained within the memory of mobile handset devices. Some embodiments provide mobile handset users with the capability to download personal data to a server after authentication and verification steps are completed. Other embodiments allow mobile handset users to provision new mobile handsets remotely by uploading personal data from a server. Some embodiments utilize alphanumeric passwords for user authentication and verification purposes. Other embodiments implement biometric sensors for user authentication and verification purposes.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

DETAILED DESCRIPTION

Figure 1:
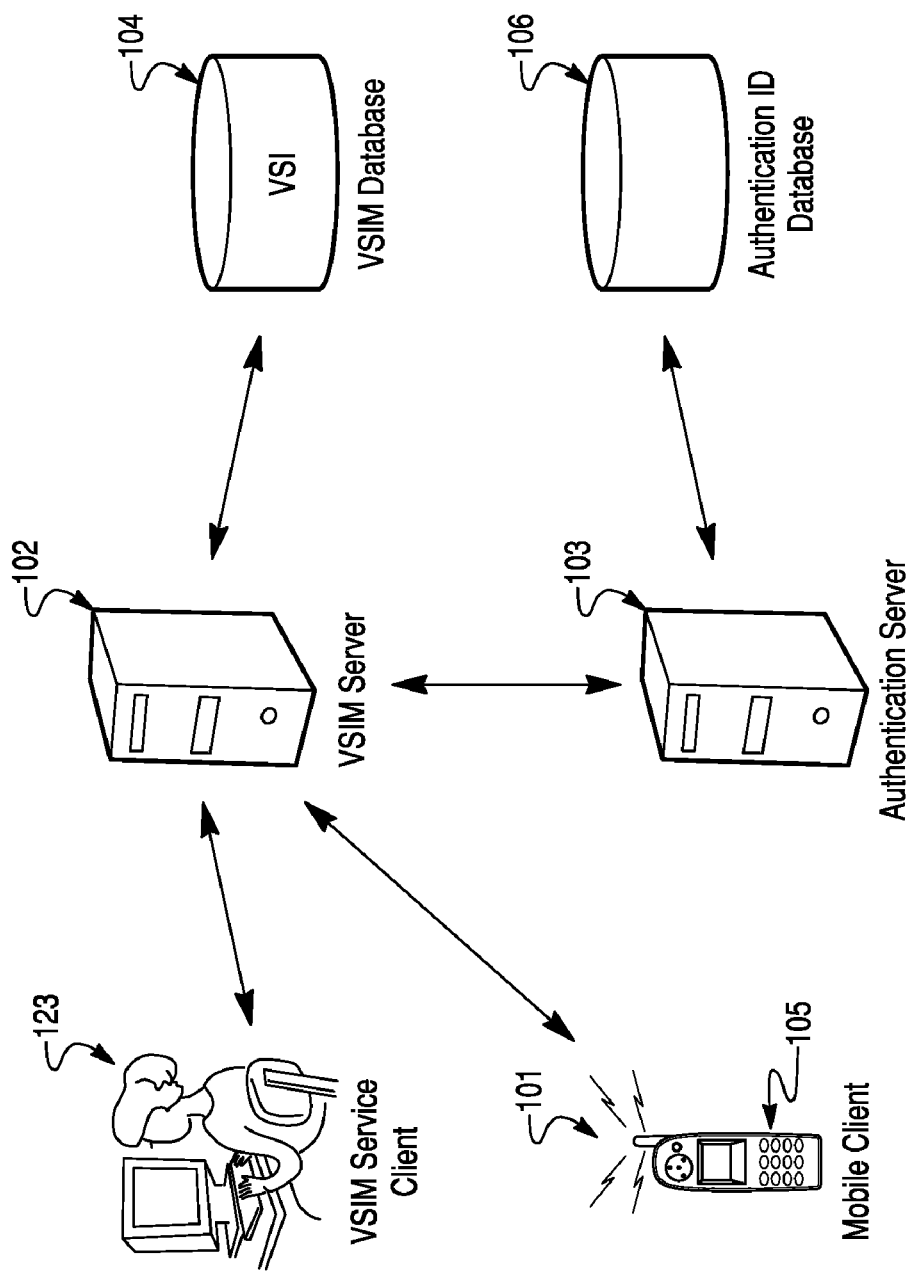
FIG. 1 is a system diagram illustrating an embodiment system which provides for virtual SIM (VSIM) capabilities.

The various embodiments will be described in detail with reference to the accompanying drawings. Wherever possible, the same reference numbers will be used throughout the drawings to refer to the same or like parts.

In recent years, expanding capabilities of mobile handset technology has increased the types and amount of personal data that may be stored within the memory of mobile handsets. There are several types of personal data that users store in their mobile handsets. Typical mobile handset users spend time programming contact information into their personal phonebooks stored within the mobile handset memory. Customization of mobile handsets, such as adding ring tones and personalized screen "wallpaper," adds more personal data stored within the mobile handset memory. Personal data may also include photos, videos, mp3 music files, third party applications such as games, etc. Additionally, the mobile handset memory may contain transmitted or received SMS messages, and data files that have been transmitted to the mobile handset for viewing or manipulation. In the case of GSM mobile handsets and their 3G successor UMTS mobile handsets, the provisioning information specific to each mobile handset is typically stored on a SIM card.

A common complaint when a mobile handset is lost or destroyed is the cost or effort of replacing and reprogramming the personal data, not the cost of replacement equipment. Additionally, some mobile handset users delay upgrading their equipment because of the difficulty of transferring personal data from one handset to another.

The Subscriber Identity Module (SIM) is a removable memory chip or smart card used in GSM and UMTS mobile handsets to store the service-subscriber key used to identify a mobile phone to cellular telephone networks. The SIM card allows users to change phones by simply removing the SIM card from one mobile phone and inserting it into another. A typical low cost SIM card has little memory, 2-3 KB, which many only be enough to contain a personal phone directory. Data stored in a SIM card is used by the phone directly. SIM cards with additional applications are available in many storage sizes, the largest being capable of storing up to 1 gigabytes of information. Smaller sized SIM cards, capable of storing up to 32 KB or 16 KB, are the most prevalent in areas with less-developed GSM networks.

The use of a SIM card is mandatory in GSM cellular telephone networks. SIM cards store network specific information used to authenticate and identify subscribers on the network, the most important of which are the ICCID, IMSI, Authentication Key (Ki), and Local Area Identity (LAI). The SIM also stores other carrier specific data such as the SMSC (Short Message Service Centre) number, Service Provider Name (SPN), Service Dialing Numbers (SDN), and Value Added Service (VAS) applications. The equivalent of a SIM card in UMTS cellular telephone networks is called the Universal Integrated Circuit Card (UICC). CDMA phones contain a Removable User Identity Module (RUIM).

Because SIM cards are removable, GSM and UMTS handset users are able to transfer personal data with relative ease by simply transferring the SIM card from one mobile handset to another. This process is available when GSM and UMTS mobile handset users wish to upgrade their mobile handset equipment or their handset is lost or destroyed but the SIM card is recovered. When the mobile handset is lost or destroyed, however, it is most often the case that the SIM card is lost or destroyed with it. In such instances, the personal data stored on the SIM card is irreparably lost.

In contrast to GSM and UMTS mobile handset users, CDMA mobile handset users cannot simply move provisioning memory card from handset to handset. When users of CDMA mobile handsets wish to replace, exchange, or upgrade their equipment, they must have a service provider download their personal data from their old phone and re-provision the information into the new phone along with their network account information.

In addition to the difficulties of reprogramming personal data into mobile devices, GSM SIM cards, as well as UMTS USIM and CDMA R-UIM physical cards, are costly for Original Equipment Manufacturers (OEMs), operators and users. Further, GSM SIM cards, as well as UMTS USIM and CDMA R-UIM physical cards, may not have sufficient storage capacity for the large amounts of use data and applications that users are now loading onto their phones. As cell phone applications become more sophisticated and demand more storage space, new cards will need to be installed as SIM, USIM, and R-UIM cards are not scalable.

An embodiment described herein can alleviate these problems by creating a virtual SIM (VSIM) card capability so internal memory can be used to store provisioning information on all mobile handsets, including GSM, UMTS and CDMA varieties. FIG. 1 illustrates an overall architecture of an embodiment wherein a mobile handset 101 communicates over a cellular telephone network with a VSIM server 102 to send and receive personal data. As is well known, the cellular telephone network includes cellular antennas 121 for communicating with mobile handsets 101 and transmitting voice and data signals over the cellular telephone network to selected destinations, such as the VSIM server 102 via a cellular telephone network interface 112. The VSIM server 102 may be coupled to an authentication server 103 such as by way of a wired, fiber optic or wireless network connection. The VSIM server 102 may contain internal memory storage units such as a mass storage disc drive, or may be in connection with a VSIM database 104, which is capable of storing the personal data information for each individual mobile handset operating on the system. Similarly, the authentication server 103 may contain internal memory storage units such as mass storage disc drives, or may be connected to an authentication database 106, which is capable of storing the authentication credentials for each individual mobile handset operating on the system. In an embodiment, the VSIM server 102 may also act as the authentication server 103 by incorporating authentication functions within the VSIM server software and providing sufficient memory storage units 104.

The mobile handset 101 includes a processor 107 and an internal memory storage unit 105, such as a random access memory or flash memory unit, which is configured to store network provisioning and personal data within the mobile handset. Since sensitive personal data, mobile handset provisioning information, as well as authentication and verification information, may be transmitted back and forth between the mobile handset 101 and VSIM server 102, the VSIM server 102 and the mobile handset processor 107 can be configured with software to encrypt such information using known data encryption and key methods to protect data from unauthorized viewing.

The virtual SIM or VSIM of the various embodiments described herein functionally takes the place of a SIM card in GSM handsets and stores the provisioning information in UMTS and CDMA handsets. In operation, a mobile handset processor 107 recalls the network provisioning information stored in the memory unit 105 (instead of a SIM card) in order to connect to the cellular telephone network. Also, handset applications like phonebooks and messaging access memory stored within the VSIM portion of the handset memory unit 105 instead of a SIM card or other removable memory cards. Information stored in the VSIM portion of the handset memory unit 105 is backed up and maintained on the external VSIM server 102.

The VSIM services provided by the VSIM server 102 may be offered to mobile handset users as a standard feature of service or as an extra subscription fee service. This architecture allows the provisioning and personal information to be uploaded to the VSIM portion of the handset memory unit 105 at any time, providing flexibility in provisioning and programming new mobile handsets. This architecture also provides users with an external backup of personal data which preserves their personal data even if the entire mobile handset is lost. By logging onto the VSIM server 102 via the cellular telephone network, users may backup their personal data to the VSIM server 102. Then, even if the entire mobile handset is lost or destroyed, their personal data is preserved, ready for reloading onto a replacement handset. To restore their personal data preserved, users log onto the VSIM server 102 via the cellular telephone network, authenticating themselves by transmitting authentication credentials for comparison against previously stored authentication credentials. Authenticated users are able to restore their personal data and, optionally, provisioning information to the replacement handset by having the information downloaded directly into the VSIM portion of the handset memory unit 105. Users who are not authenticated are denied access to the VSIM database.

Figure 2:
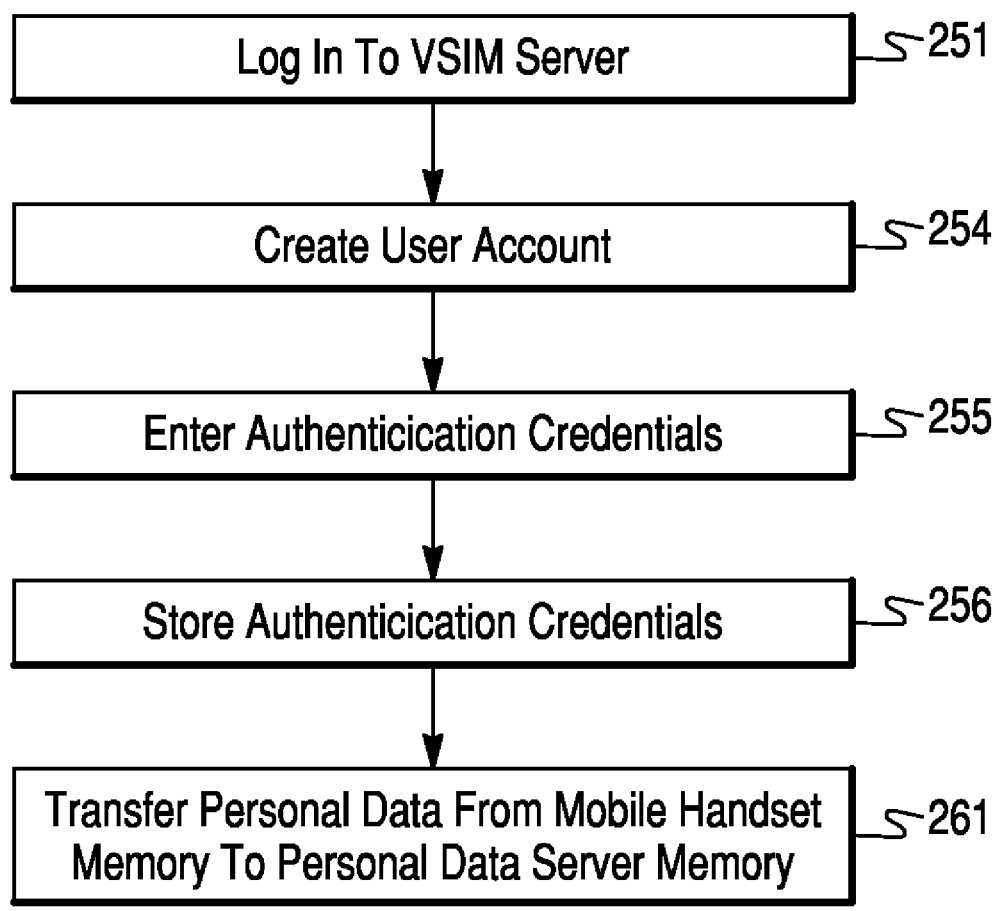
FIG. 2 is a process flow diagram illustrating the steps of an embodiment method for initializing a VSIM capability.

FIG. 2 illustrates in overview the process for creating a VSIM account on the VSIM server 102 and uploading personal data. VSIM service users must first set up a VSIM account on the VSIM server 102, which may be operated by the network service provider or a third party VSIM service provider. To do so, users logs in to the VSIM server 102, step 250. This may be accomplished via the mobile handset 101 over the cellular telephone network 122 or by using a computer 123 connected to the VSIM server 102 via the Internet 124 and Internet interface 125. Data security measures, such as SSL or other secure link, may be used to protect users' account and authentication information from being intercepted. Once logged onto the VSIM server 102, the user creates a user account, step 254. Such an account may be created by entering personal information into a webpage or into the handset itself. In the process, the user may create an account name (or user name) which is an arbitrary but unique account name that will be associated with the specific handset 101 being registered. For example, the phone number of the mobile handset may be used as the account name. The user may also enter a password to be associated with the VSIM user account. The user's biographical information and user account name are stored as a file in the VSIM database 104.

As part of setting up the user account, the user will be prompted to enter authentication credentials, step 255. Since the VSIM server 102 is configured to be easily accessible to users and contains sensitive information, it is important that it be configured to authenticate users prior to transferring data. To enable this, the system must be provided with authentication information at the time the account is created that will be used in subsequent sessions to authenticate each user prior to granting access to the sensitive information. Any of a number of authentication methods may be employed, including password verification, biometric recognition, and combinations thereof. The authentication credentials are received by the VSIM server 102 (via the mobile handset 101 over the wireless communication network or through the user's computer via a secured Internet link) and stored in the authentication database 106 via the authentication server 103 as an authentication file associated with the user account name, step 256.

In an embodiment, the authentication credential may be a simple alphanumeric password. In such an embodiment, the user will either be given a password or provided an opportunity to enter a password that will be stored in the authentication server 103 in conjunction with the user account name (or a key tied to the user account name stored in a different database). The user may also be prompted to enter a security question to be used in cases when the user forgets the password and needs to be issued a new one.

In embodiments using biometric authentication, some biometric information, such as a fingerprint image, is obtained and stored in the authentication server 103 for use as the authentication credential. Such biometric information may be, but are not limited to, finger print images, spoken phrases for use in voice recognition, facial images for use in facial recognition, handwriting samples for handwriting analysis, images from retinal scans, and three dimensional scans of the shape and depth of a user's ear canal. In embodiments using finger print biometric information, users will have a fingerprint scanned to generate a fingerprint template that is stored in the authentication server 103. For other forms of biometric authentication, users may record a voice sample or have their retina scanned, with the resulting recording (or voice print) or image stored in the authentication server 103. For embodiments using facial recognition as a form of authentication, a camera on the mobile device may be employed to take detailed photographs of a user's face. Similarly, a digital pen may be coupled to the mobile device and used to record handwriting samples. An application specific sensor may be employed to record the shape and depth of a user's ear canal.

Figure 10:
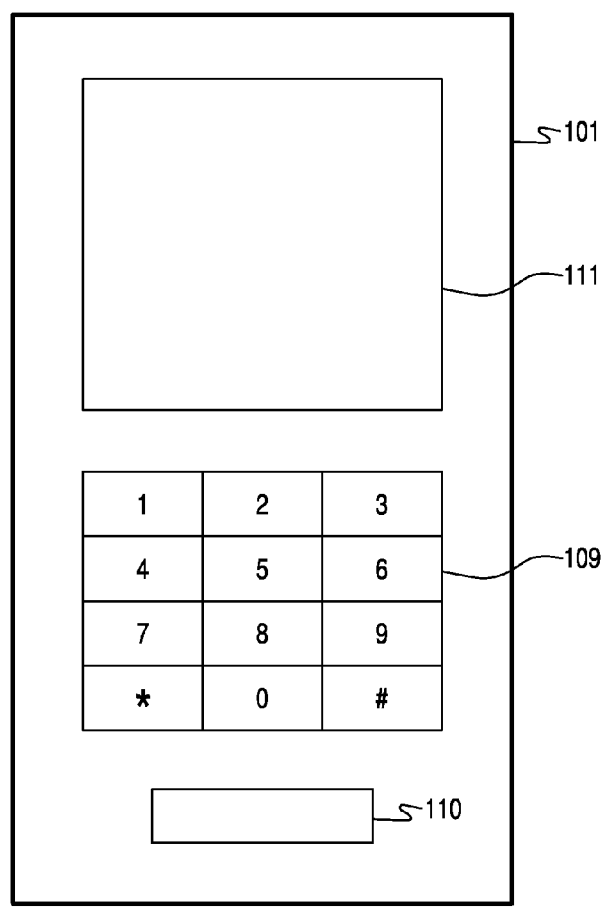
FIG. 10 is a perspective view of a mobile handset with a biosensor for user authentication.

In an embodiment illustrated in FIG. 10, the mobile handset 101 has a biometric sensor 110 attached or built-in to permit the user to be reliably authenticated to the VSIM server 102. As shown, the mobile handset 101 may also include a user interface display 111 and alphanumeric keypad 109. The biometric sensor may comprise a fingerprint scanner 110 which is configured to generate an image or pattern data of a user's fingerprint as a finger is swiped over the sensor. The finger print image or pattern data may be temporarily stored in an internal memory of the handset until it is ready for transmission to the authentication server 103. After transmission, the biometric data will be deleted from handset memory 105 as this information should not be permanently stored within the mobile handset 101. In other embodiments, the fingerprint sensor may be in addition to or in place of a camera to record retinal patterns for retinal scanning authentication or facial features for facial recognition authentication. Alternatively, a digital pen and pad may be added to allow the user to submit a handwriting sample for authentication by writing on the pad with the digital pen. Similarly, a sensor capable of measuring the shape and depth of the ear canal may be added or used in place of the fingerprint sensor 110.

Once the user account is established in the VSIM server 102 and the proper authentication credentials have been stored in the authentication server 103, personal data may be transferred from the mobile handset memory 105 to the VSIM database via the VSIM server 102, step 254. In instances where the user account and authentication credentials are sent via a computer through a secure Internet connection, the user will need to perform the upload/backup steps described below at a subsequent time by linking the handset 101 to the VSIM server 102 via a cellular telephone network to transfer the personal data from the internal memory 105 to the VSIM database 102. Transferred personal data is stored by the VSIM server 102 in files located within the VSIM database 104 associated with or keyed to the user account. This creates an external VSIM backup file of the network provisioning and personal data stored within the mobile handset's internal memory unit 105.

Once the user account is established and personal data is backed up to the VSIM server 102, a user may update and/or recover the personal data at any time by linking the handset 101 to the VSIM server 102 via a cellular telephone network and providing the user's account name and authentication credentials. Once the handset is logged in to the VSIM server, the user can manually initiate an update or download, such as by responding to menu prompts on the handset user interface display 111. In an embodiment, the user's personal data may be automatically updated any time a change to, a new entry is created in, or a data entry is deleted from the personal data stored the handset. Also, scheduled backups may be automatically performed on a predetermined schedule, such as daily, weekly, monthly, yearly, etc. Such automatic updates may be made by the handset 101 automatically linking to the VSIM server 102 and transferring the updated data files without prompting by the user.

Figure 3:
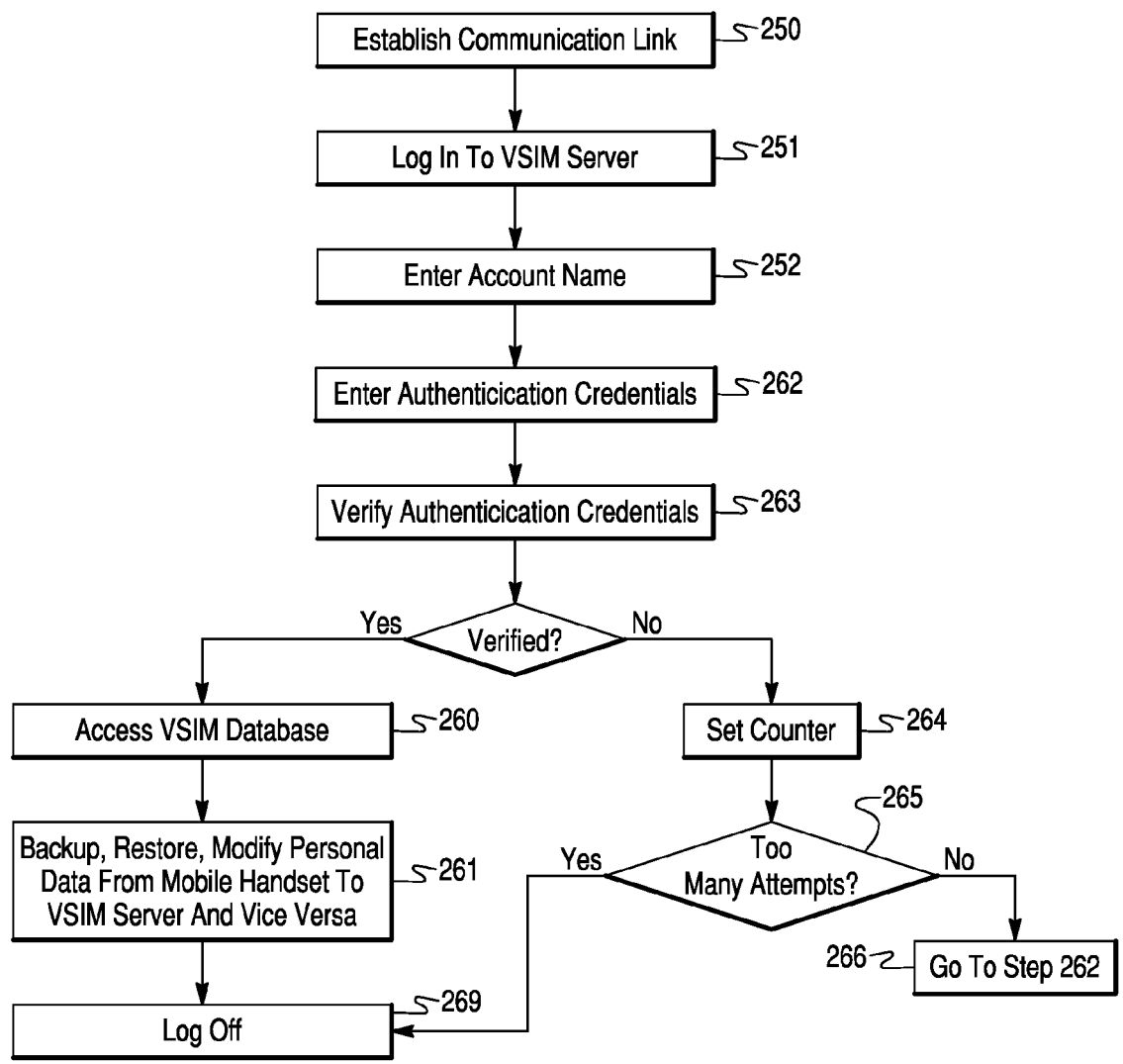
FIG. 3 is a process flow diagram illustrating the steps of an embodiment method for backing up/restoring/modifying personal data.

FIG. 3 illustrates an embodiment method for backing up, modifying and restoring personal data using the VSIM capability after the user account has been initialized. Upon power up of the mobile handset or any other interval preset by the user or service provider, the mobile handset establishes a wireless communication link via a cellular telephone network to the VSIM server 102, step 250. Once the communication link has been established, log in to the VSIM server 102 is accomplished, step 251. As part of the login process, the user may be prompted to enter the user's account information via the handset keyboard, step 252. The account name may be automatically received by the VSIM server 102, such as if the phone number associated with the mobile handset is used as the user account name. The user may also be prompted to enter authentication credentials, step 262. As above, the authentication credentials may be a simple alphanumeric password or some form of biometric data entered at the mobile handset 101. Once entered into the handset, the authentication credentials are preferably encrypted by the handset processor 107 and transmitted via the cellular telephone network to the VSIM server 102, which may pass the data to the authentication server 103.

The VSIM server 102 and/or authentication server 103 decrypts the received user account and authentication credential data, and accesses the stored authentication credentials associated with the user accounts (which were stored in the authentication server database 106 during the account setup procedure step 256). The received authentication credentials are compared to the stored authentication credentials to authenticate the user and verify that an authorized user is attempting to log in, step 263. If the authentication credentials match, the user is authenticated and access is granted to the user account files stored within the VSIM database 104, step 260.

Once access has been granted, the user may upload/backup personal data from the mobile handset internal memory 105 to the VSIM database 104 via VSIM server 102, or restore personal data to the handset memory, step 261. During a backup procedure, personal data is transmitted from the internal memory 105 of the mobile handset 101 to the VSIM database 104 via the VSIM server 102. During the restore operation, personal data is transmitted from the VSIM database 104 to the mobile handset 101 and stored in its internal memory 105. The user may also perform other operations, such as modifying personal data stored within the VSIM database 104. A data modification procedure may be similar to the backup procedure. So long as access is granted to the user, personal data may flow from the mobile handset 101 to the VSIM database 104 via the VSIM server 102 and vice versa. Once the user has completed the desired backup, restore, modify procedures, the user may log off the VSIM server, step 269.

If the authentication credentials do not match, then access to the VSIM database 104 via the VSIM server 102 will be denied. As shown in FIG. 3, a flag may be set or a count established to record the number of unsuccessful authentication attempts, step 264. If the number of unsuccessful authentication attempts exceeds a preset number, the user may be logged off by the VSIM server 102, step 269. Otherwise, the user may be prompted to attempt to authenticate again, step 266. In alternative embodiments, the method may simply allow unlimited authentication attempts, in which case it would not be necessary to perform the initiate counter step 264 or determine if too many attempts had occurred as in step 265.

Figure 4:
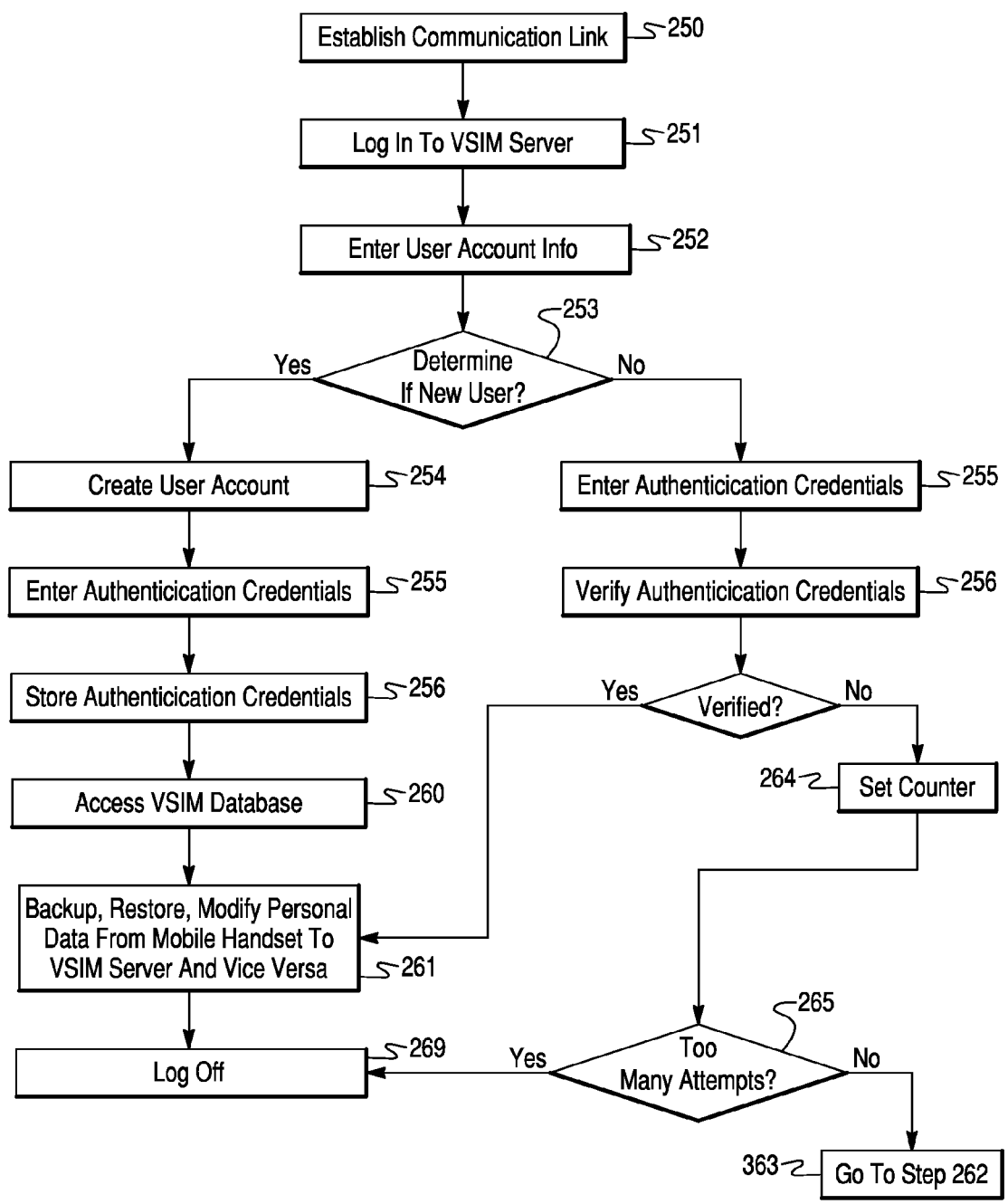
FIG. 4 is a process flow diagram illustrating the steps of an embodiment method by which a mobile handset can request access to the personal data server.

The VSIM server 102 may be configured with software to determine whether a user should be directed to the account creation process, such as illustrated in FIG. 2 or an account access process, such as illustrated in FIG. 3. For example, FIG. 4 illustrates an embodiment method implemented in the VSIM system which incorporates both the account initialization procedure as well as the backup/restore/modify procedure. As above, upon power up of the mobile handset or any other interval preset by the user or service provider, the mobile handset establishes a communication link via the cellular telephone network to the VSIM server 102, step 250. Once a communication link has been established, the handset begins the process of logging in to the VSIM server 102, step 251. As part of the login process, the user may be prompted to enter user account information via the handset keyboard, step 252. This information may be automatically provided, such as if the phone number associated with the mobile handset is used as the user account name or if the handset is configured to automatically provide the user account information. The VSIM server 102 then uses the received account information to determine if the user account name is new or already exists in the database, step 253. To do this the VSIM processor may simply perform a search and retrieve operation of existing user account file names stored in the VSIM database 104. If the user account is not found in the database, then the user is determined to be new and the server performs the new account creation steps 254, 255, and 256 described in more detail above with reference to FIG. 2. Once the new user account has been established and authentication credentials stored, the new user is given access to the VSIM database 104 via the VSIM server 102, step 260.

If it is determined that the user account name is not new, the user is authenticated in steps 262 and 263 described above with reference to FIG. 3. If the user is authenticated, the user is given access to the VSIM database 104 via the VSIM server 102, step 260. If the user is not authenticated, the server initiates the conditional retry process of steps 264, 265, 266, 269 described above with reference to FIG. 3.

Figure 5:
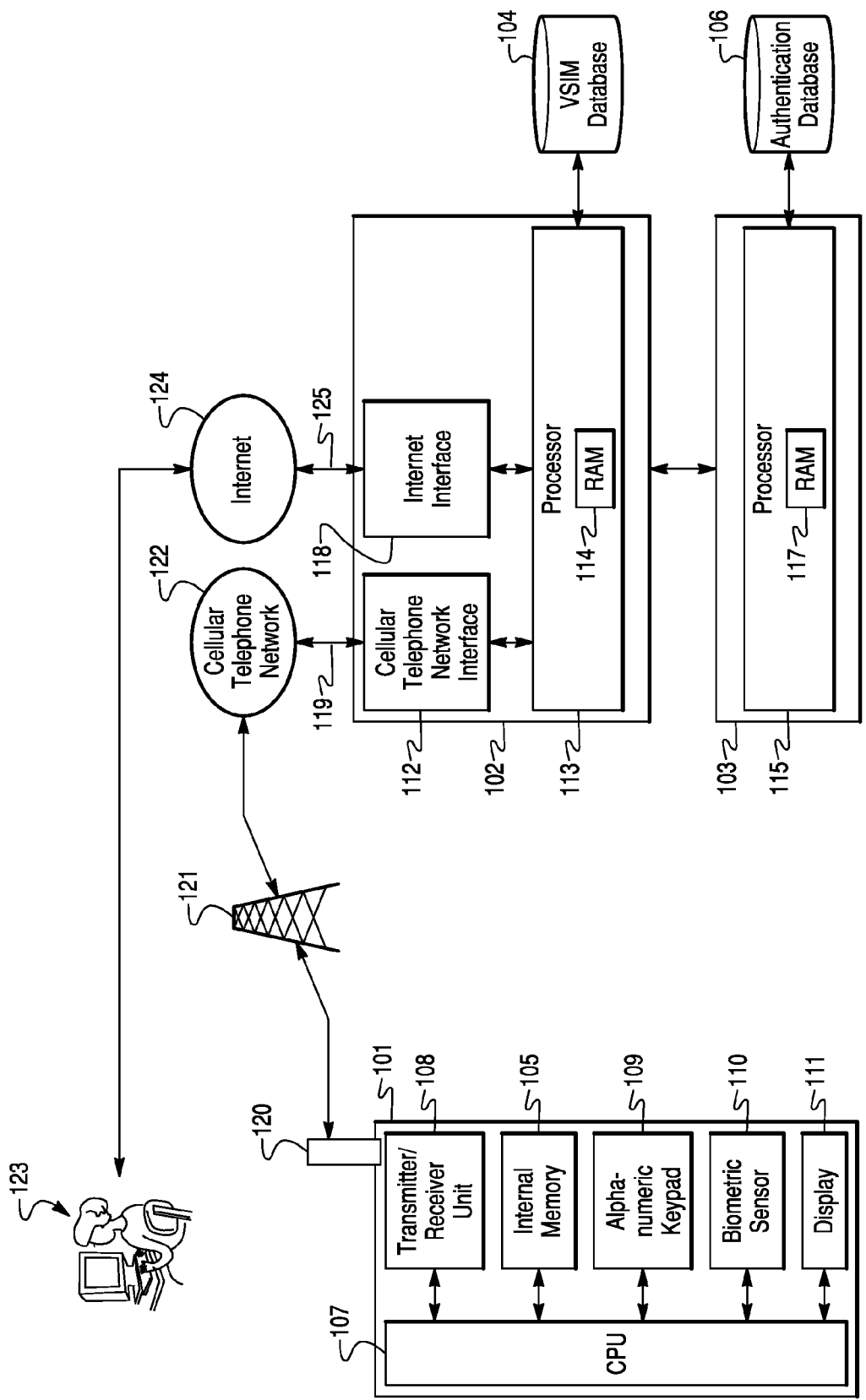
FIG. 5 is a system diagram illustrating a mobile communication system embodiment which provides users with the ability to backup and recover personal data using a VSIM personal data server.

FIG. 5 is a block diagram of the equipment and components used when the mobile handset 101 requests access to the VSIM server 102. As shown, the handset 101 includes a processor 107 that is coupled to internal memory 105, the keypad 109, a biometric sensor 110 (if included), a display 111, and the transmitter/receiver unit 108 which is connected to an antenna 120. The VSIM server 102 includes network interface circuits 112 for connecting to the cellular telephone network 122 via a wired or fiber optic data link 119 and/or Internet interface circuit 118 for connecting to the Internet 123 via a wired or fiber optic data link 124. While embodiments described herein utilize a communication link between the mobile handset 101 and VSIM server 102 over a cellular telephone network 122 and network interface circuit 112, the mobile handset 101 may also connect to the VSIM server 102 via a local connection with a computer 123 via the Internet 124 and Internet interface circuit 118. For example, the mobile device may be coupled to a computer 123 connected to the Internet 124 by a USB cable (not shown), with the computer and mobile device configured with software to enable the downloading and uploading of data to be effected via the Internet without accessing the cellular telephone network. The VSIM server 102 also includes a processor configured with software to function as a server and to provide the services of the various embodiments described herein. Connected to the VSIM server 102 may be a VSIM database 104, such as in the form of a bank of disc drives. If a separate authentication server 103 is employed, it too will include a processor 115 configured with software to provide the authentication services of the various embodiments described herein, and an authentication database 106.

When a user wishes to access the VSIM server 102, whether it be to back-up, restore, or modify the user's personal data, the mobile handset 101 establishes a communication link with the VSIM server 102 via the cellular telephone network 122. This data link travels wirelessly between the transceiver unit 108 in the mobile handset 101 and the local cell phone tower 121, and then over telephone lines and/or wire or fiber optic lines 119 before connecting to the VSIM server 102 through the network interface circuit 112. After the communication link between the mobile handset 101 and the VSIM server 102 has been established, the user logs in to the VSIM server as describe above with reference to step 251. A request to login to the VSIM server 102 may be made by the user pressing a dedicated button (not shown) on the mobile handset 101 or via the alphanumeric keypad 109 such as in response to a menu option provided on the display 111. In the process of logging onto the VSIM server 102, the user or the handset provides an account name (step 252) which may be accomplished via the alphanumeric keypad 109. The account name is transmitted and received via the established wireless communication link. The server processor 113 performs a database lookup in the VSIM database 104 using the received account name to determine if it is an existing account or a new user is trying to initialize a new account (step 253).

If the processor 113 determines that a new user has contacted the VSIM server 102, the processor 113 performs the new account creation procedure described above to create a new user account file in the VSIM database 104. To prompt the user to enter authentication credentials, the processor 113 can transmit an instruction to the mobile handset via the cellular telephone network to present a user interface on the display 111. Alternatively, the processor 113 can generate an image for presentation on the display 111 requesting the user to enter authentication credentials. The user can enter authentication credentials via the alphanumeric keypad 109 in response to the display 111, through a biometric sensor 110, or a combination of both. The authentication credentials are transmitted back to the VSIM server 102 for storage in the authentication database 106 (step 252). After the initialization procedure is complete, the new user is granted access to the VSIM server 102 to backup personal data stored in the mobile handset internal memory 105 by performing steps 260 and 261 described above with reference to FIG. 3.

If the processor 113 determines that the user account name already exists, the processor 113 will prompt the user to enter authentication credentials by transmitting an instruction to the mobile handset to present a user interface on the display 111. Alternatively, the processor 113 can generate an image for presentation on the display 111 requesting the user to enter authentication credentials. The user can enter authentication credentials via the alphanumeric keypad 109 in response to the display 111, through a biometric sensor 110, or a combination of both. The authentication credentials may be transmitted back to the VSIM server 102 for comparison against the authentication credentials stored in the authentication database 106 (step 263). The authentication credentials may be verified by the authentication server processor 115. Alternatively, the authentication verification of step 263 may be performed by the VSIM server processor 112 if that processor is configured by software to also perform the authentication function. If the authentication credentials entered by the user match the authentication credentials previously stored in authentication database, then the user is granted access to the VSIM database 104 via VSIM server 102 (step 260). Once access to the VSIM database 104 is granted, the processor 113 retrieves the files associated with the user account name stored within the VSIM database 104. The user may then be presented with a user interface on the handset display 111 to ability to backup, restore, or modify the personal data stored within the VSIM database 104 associated with the user account name (step 261). After the backup/restore/modify procedure (step 261) is complete, the user is logged off the VSIM server 102 and VSIM database 104 (step 269).

If the authentication credentials are not verified (step 263), then the user is denied access to the VSIM server 102 and VSIM database 104. The authentication server processor 113 (or VSIM processor 112) may set start a counter stored in processor RAM 118 or 114 (step 264) to record the number of unsuccessful authentication attempts. After the counter is started, the processor 113 (112) may compare the counter value with a preset threshold number to determine if too many unsuccessful attempts have been made. If too many unsuccessful attempts have been made, the processor may log off the user as in step 269. If the user has not made too many unsuccessful attempts, then user may be prompted to enter the authentication credentials again, as in step 262. In alternative embodiments, the user may be allowed an unlimited number of unsuccessful attempts.

An embodiment allows the user to backup personal data any time there is any change to the personal data stored in mobile handset internal memory 105. Thus, if a user adds, deletes, or changes personal data stored in the mobile handset 101, the mobile handset processor 107 may set a flag in internal memory 105 during the process of entering the change, and then, in response to the flag, automatically initiate the backup process described above to update the personal data file stored in the VSIM database 104. Alternatively, the user may be prompted at regular intervals, such as once a week, once a month, once a year, every power up cycle, every recharge cycle, etc., to perform a personal data back up operation. To accomplish this, the processor may compare (e.g., subtract) the present date to the date of the last update event stored in internal memory 105 to determine if the elapsed time exceeds an interval value also stored in internal memory 105.

An embodiment allows users to restore all of their personal data from an old mobile handset to a new mobile handset, as may occur when users update their mobile handset equipment or lose their mobile handset. In such instances, there is no need to create a new user account since the user is already known to the VSIM server 102 and authentication server 103. To load personal data to the new handheld, the user simply performs the backup procedure described above with reference to FIG. 3 to backup personal data stored in the old mobile handset's internal memory 105 to the VSIM database 104. Next, the user logs into the VSIM server 102 with the new mobile handset and initiates the restore procedure. The personal data that was once stored in the internal memory of the old handset is downloaded from the VSIM database 104 to the internal memory 105 of the new mobile handset 101.

Another embodiment allows users to customize any mobile handset with their personal data and settings. For example, users traveling abroad who rent a mobile handset and users of disposable mobile handsets can have ready access to their personal data and customization choices. By establishing a communication link with and logging into the VSIM server 102, users may access their account and verify their authentication credentials on the rented or disposable mobile handset 101. By performing the restore procedure users can download their personal data stored in the VSIM database 104 to the internal memory 105 of the rented or disposable mobile handset 101. After users are finished with the rented or disposable mobile handset, the data can be deleted from handset internal memory 105 without losing the information. Thus, the VSIM service enables users to utilize their cell phone personal data on a temporary handset without the time or effort required to reenter the information and reprogram the handset with personal preference options.

In a similar manner, the various embodiments enable multiple users to make use of their own VSIM accounts to facilitate time-sharing of a single mobile handset. For example, if multiple users are sharing a single mobile handset, each user can customize the mobile handset during their use by downloading their personal data from their own VSIM service account. Since the personal data may include the cell phone provisioning information, phone usage can be charged to the each user's account. Similarly, a user with a VSIM service account can borrow any mobile handset, download their personal data including provisioning information from the VSIM server 102, and then use the borrowed handset as if it were their own. The borrowed handset provides the present user with access to that user's phonebooks and other personal data, and wireless charges for use of the borrowed mobile handset are be properly billed to the user's account. When the borrowed phone is returned, the owner's personal data can be restored to the phone from the VSIM server 102, after which the owner would not see any changes to the settings on the phone or charges to his/her account.

The VSIM capability enables a new way to sell and provision mobile handset equipment that does not require the new phone purchaser to visit a cellular phone store. Since the provisioning information is stored in the VSIM server 102 and in internal memory 105 of the handset, a handset can be provisioned by simply setting up an account with the VSIM server 102 and then performing the restore procedure to load the new provisioning information onto the handset 101. In this manner, users can purchase phones from anyone or any store and provision their new handsets without having to visit a cellular phone store or other provisioning center.

Figure 6:
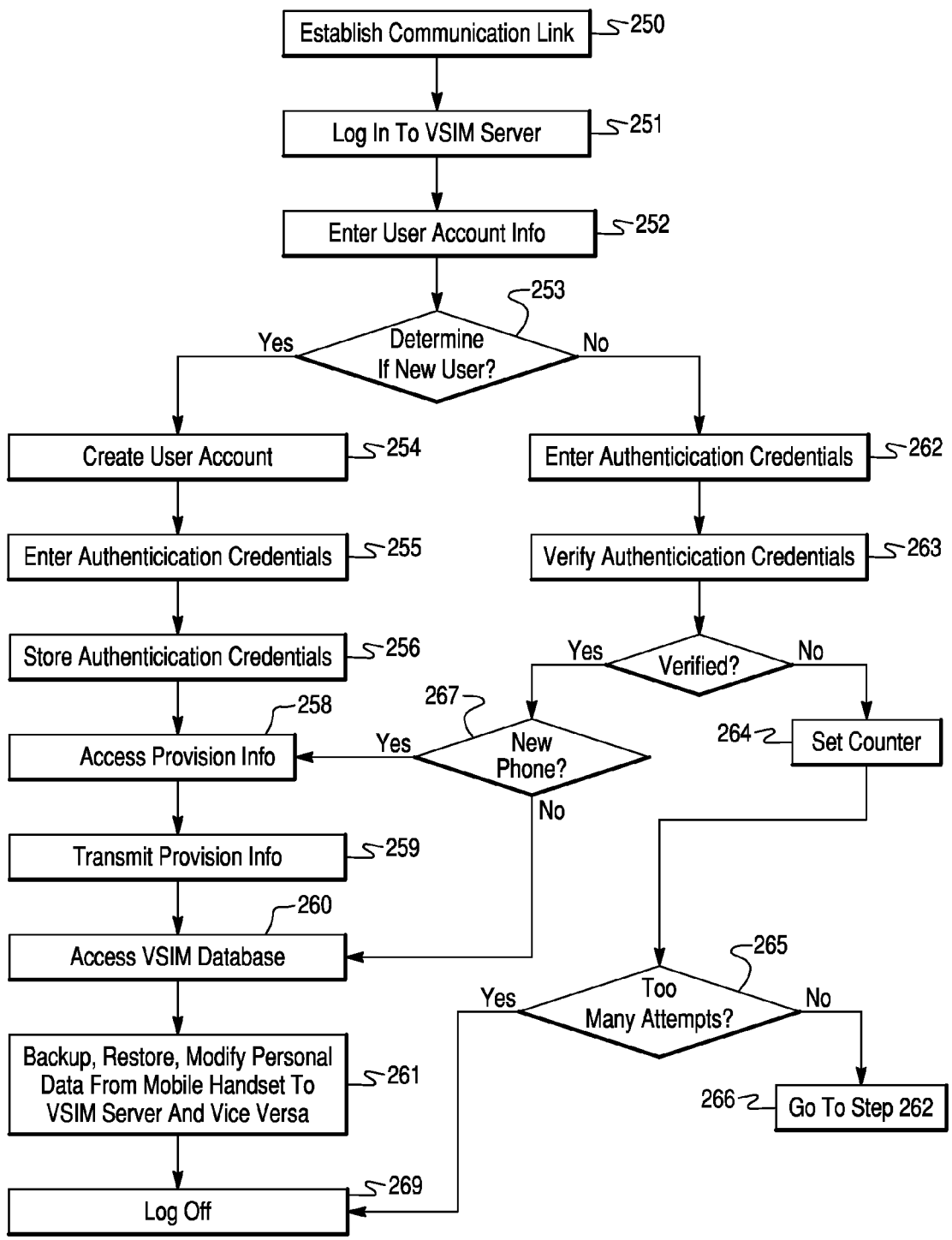
FIG. 6 is a system diagram illustrating a system embodiment which provides new mobile handset provisioning and VSIM capabilities.
Figure 7:
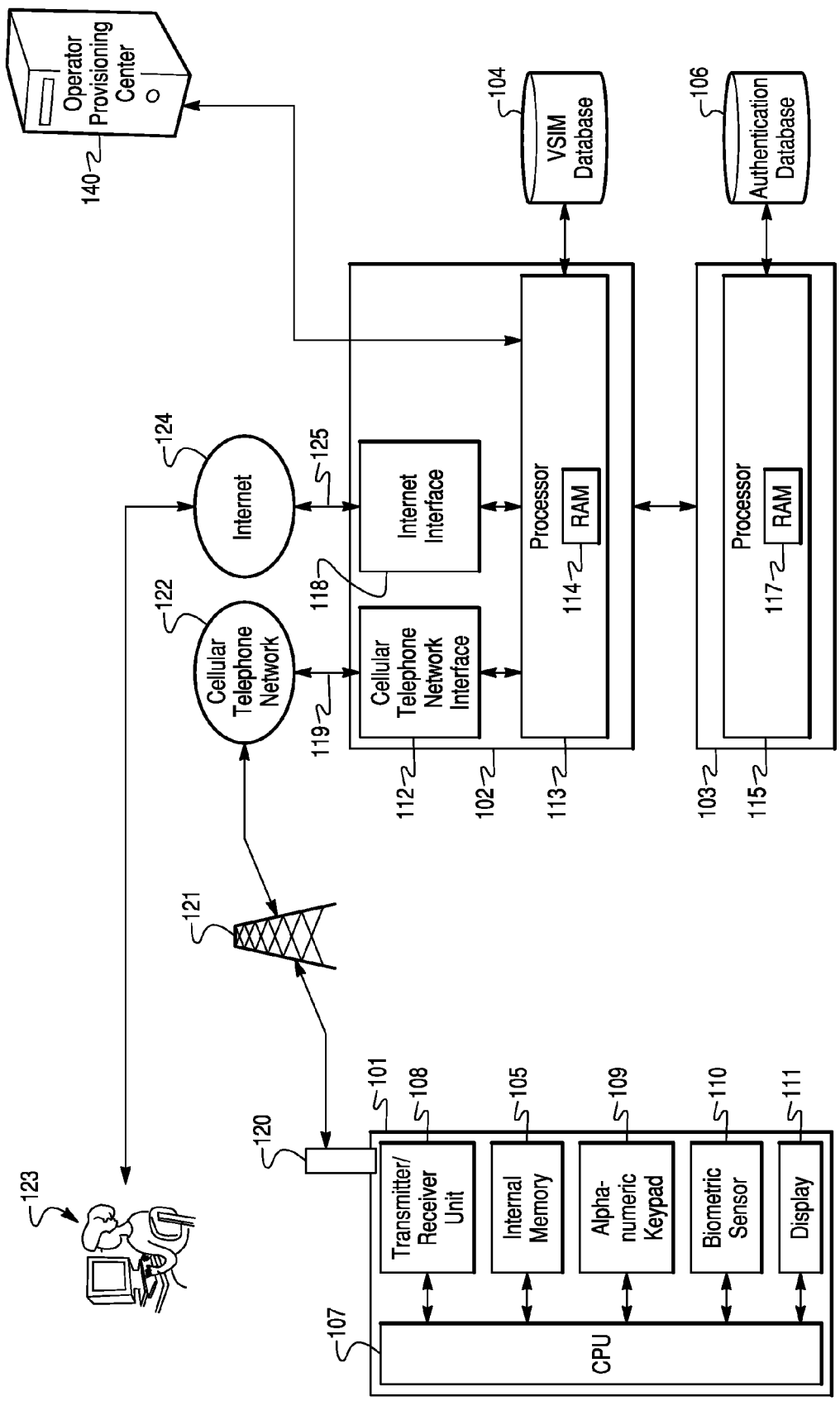
FIG. 7 is a system diagram illustrating a mobile communication system embodiment which provides users with the ability to provision a new mobile handset using virtual SIM capabilities.

FIG. 6 and FIG. 7 illustrate an embodiment of the VSIM system which provides for the flexible provisioning of new mobile handsets 101. This embodiment includes an Operator Provisioning Center 140 in communication (either wired or wirelessly, such as via the Internet) with the VSIM server 102. The Operator Provisioning Center (OPC) 140, which may be operated by the cellular telephone service provider or a third party, maintains the information, including available phone numbers and necessary provisioning data, to provision a new mobile handset on the service provider's network. For example, in a CDMA based network, this information may include CDMA PRL List, NAM ID, Current SID, SID List, etc. The reference to CDMA provisioning information is not intended to be limiting and should not be interpreted as narrowing the scope of this invention or the claims. Alternative provisioning information related to GSM, UMTS, or equivalent networks may be included in the OPC 140.

The embodiment operates similarly to the operation of the VSIM system described above with reference to FIG. 4 above (steps 250-253), but includes steps for provisioning the phone remotely by accessing the OPC, step 258. As shown in FIG. 6, if the VSIM processor 113 determines that the user is a new user, the user is prompted to create a new account (step 254), enter authentication credentials (step 255) and the authentication credentials are stored (step 256) in the authentication database 106. Once the authentication credentials are stored in the authentication database 106, the VSIM processor 113 accesses the OPC 140 to retrieve new provisioning information (step 258). The new user may be given a choice among a number of available telephone numbers, and once a telephone number is selected, the number is assigned to the new user and the associated provisioning information added to the user account personal data file stored in the VSIM database 104. After the new provisioning information is retrieved from the OPC 140, the provisioning information is transmitted to the mobile handset 101 (step 259) from the VSIM server 102 via the cellular telephone network, such as by initiating a restore procedure. Because the mobile handset will not have any provisioning information until after step 259, minimal or initialization-only provisioning information allowing the mobile handset to communicate with VSIM server 102 must be stored in the mobile handset 101 at the time it is stored. Mobile handsets 101 may be provisioned during manufacture or at the time of sale with information to enable them to communicate only with a specified VSIM server 102 until full provisioning information is received in step 259. Alternatively, mobile handsets may be provisioned during manufacture or at the time of sale with information sufficient to allow them to be registered with a number of VSIM service providers, thereby giving users the flexibility to purchase phones from the store of their choice and purchase VSIM services from the VSIM service provider of their choice.

If the VSIM processor 113 determines that the user is an existing user with an existing user account stored on the VSIM database 104, the user will be prompted to enter their authentication credentials (step 262). Once the authentication credentials are received via the VSIM server 102, the user will be verified if the entered authentication credentials match the authentication credentials stored within authentication database 106. If verified, the user may be asked if the user has updated their equipment with a new mobile handset 101, step 267. If the user has updated their mobile handset 101, the new mobile handset may access the OPC 140 to retrieve the full provisioning information required by the new mobile handset. Accordingly, the OPC 140 will be accessed and the provisioning information will be transmitted to the new mobile handset 101, step 259. Once the mobile handset 101 is fully provisioned (or at the same time as provisioning information is downloaded), the VSIM database 104 may be accessed in step 260 to restore all of the user's personal data stored therein to the new mobile handset 101. After the personal data is restored the user may log off the VSIM server 102.

If, instead, the user has not updated their mobile handset 101 equipment with a new phone, then after the authentication process is complete and the user is verified (step 263), the mobile handset 101 is granted access to the VSIM server 102 (step 260) to either backup, restore or modify the personal data, step 261

Referring to FIG. 7, illustrates how the same system elements as described above with reference to FIG. 5 are involved to enable this flexible provisioning of mobile handsets with the addition of a server and database at the Operator Provisioning Center 140 (OPC). The OPC 140 may be part of or linked to the service provider's cellular telephone network 122. This center will have a server coupled to a network accessible by the VSIM server 102, such as the Internet WWW. The server will include within its memory or in a connected database a record of available telephone numbers and associated provisioning information.

Figure 8:
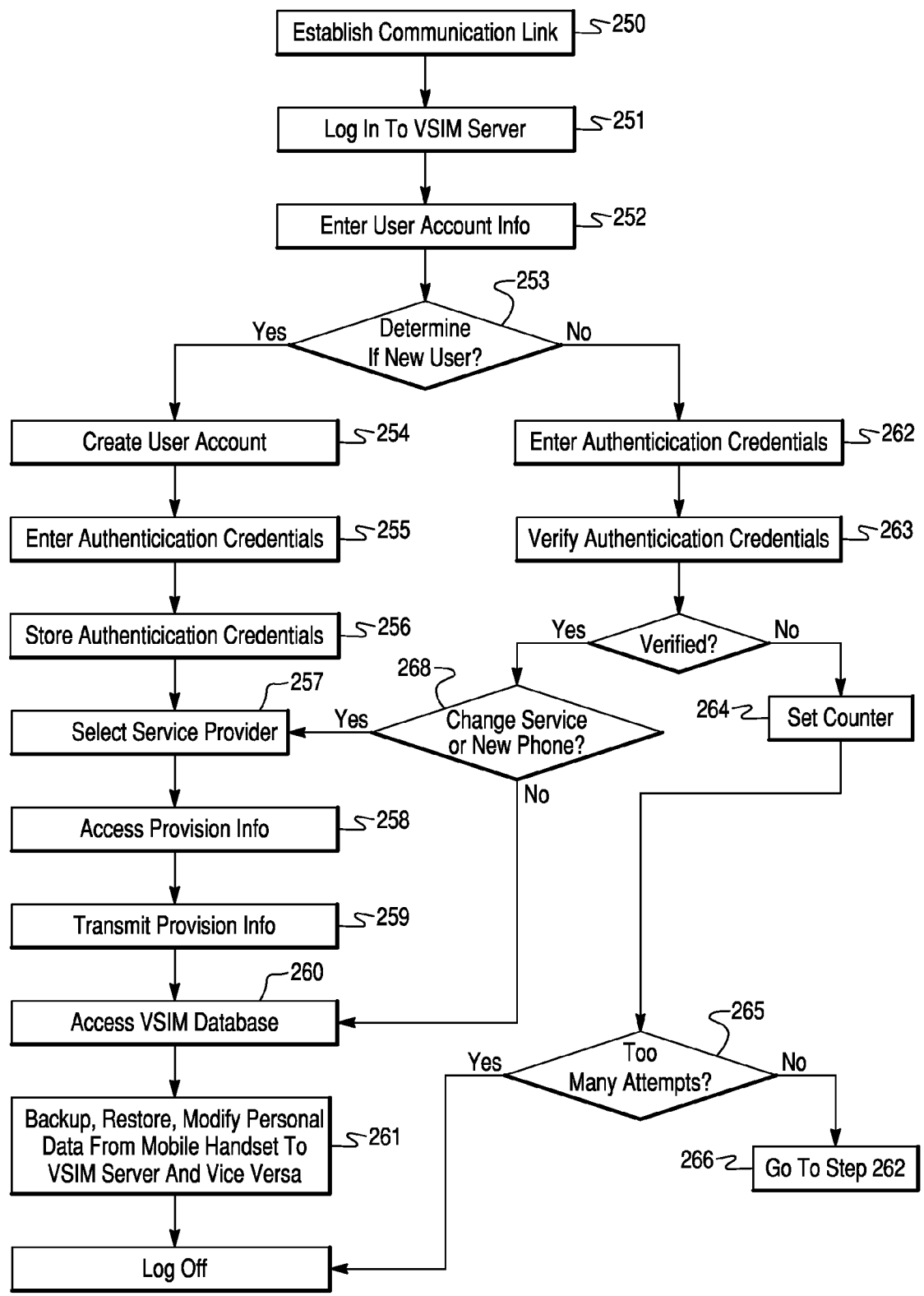
FIG. 8 is a system diagram illustrating a system embodiment which provides new mobile handset provisioning from a plurality of service providers.
Figure 9:
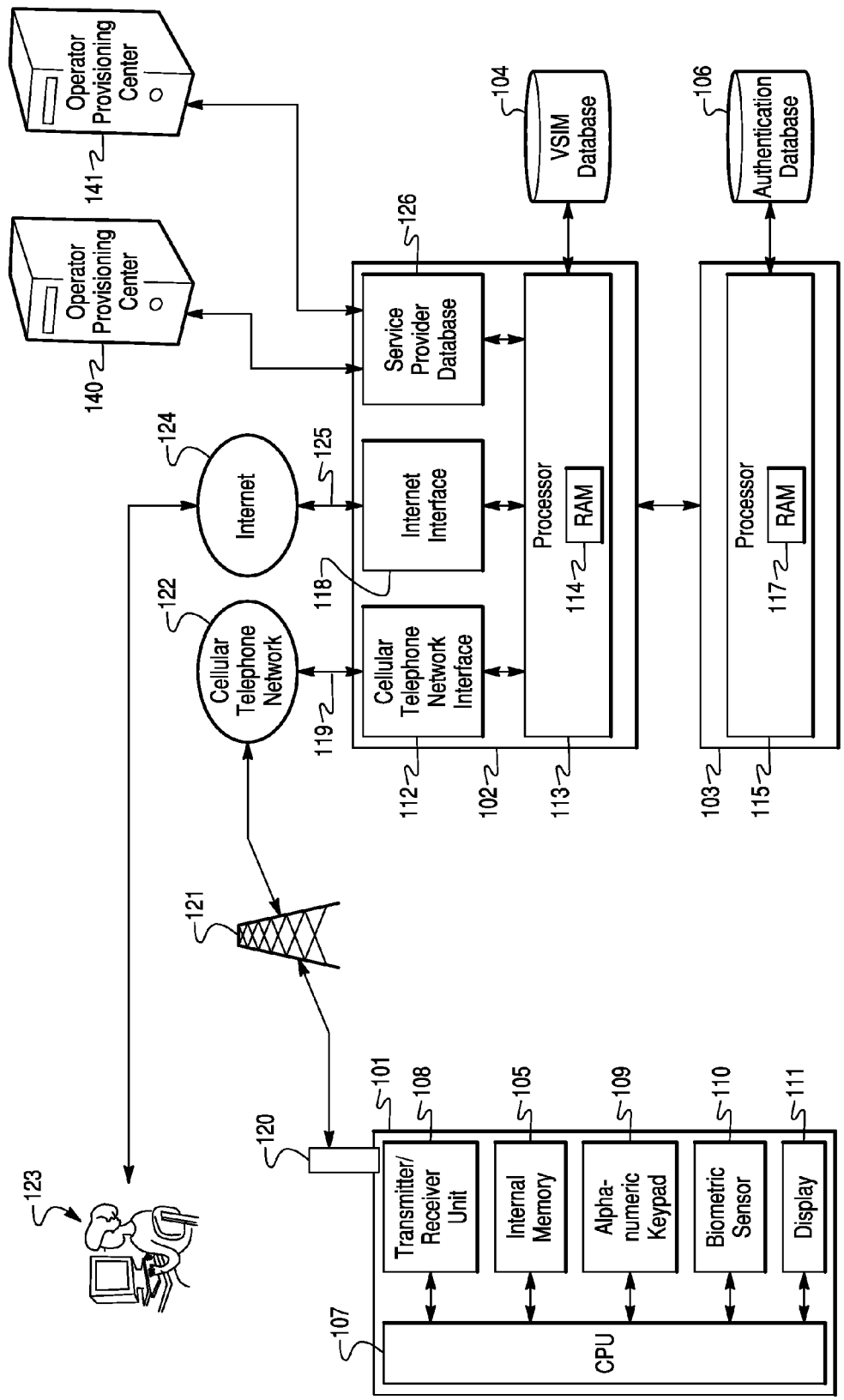
FIG. 9 is a system diagram illustrating a mobile communication system embodiment which provides users with the ability to provision a new mobile handset from a variety of service providers using VSIM capabilities.

The VSIM capability also enables a new way to sell and provision mobile handset equipment that is not tied to a particular cellular service provider. FIGS. 8 and 9 illustrate an embodiment which enables users to purchase and provision a new mobile handset without dealing with a wireless service provider. In the past, mobile handsets had to be purchased from the service provider since the provisioning information had to be programmed into the phone or provided on a SIM card. The service provider provisioned the purchased mobile handset so that it could only operate on the service provider's wireless network without roaming. This locked the user in to that one service provider. It also required the user to take the time to visit the service provider's provisioning center and wait to have their phone programmed.

In the embodiment illustrated in FIGS. 8 and 9, a generic (i.e., not affiliated with a particular service provider) mobile handset may be purchased at any location without being locked into a particular service provider or even a location unaffiliated with any specific service provider. The generic mobile handset 101 has stored within the internal memory, sufficient information to allow it to establish a cellular telephone communication link with a VSIM server 102. The VSIM server 102 may be operated by an independent entity not affiliated with any one service provider. As with the preceding embodiment, mobile handsets 101 may be provisioned during manufacture or at the time of sale with sufficient information to enable them to only communicate with a specified VSIM server 102 until full provisioning information is received. Alternatively, mobile handsets may be provisioned during manufacture or at the time of sale with information sufficient to allow them to be registered with any of a number of VSIM service providers, thereby giving users flexibility to purchase phones from the store of their choice, purchase VSIM services from the VSIM service provider of their choice, and then select the cellular service provider of their choice from the options offered by the VSIM service provider. The VSIM service provider may be a business that is separate and independent from any one cellular service provider, such as a separate business or cooperative owned by all cellular service providers in an area.

This embodiment operates in a manner similar to the operation of the VSIM system described above with reference to FIGS. 6 and 7, but includes further steps for selecting a service provider (step 257) in order to provision the phone remotely. To facilitate this selection, the VSIM service provider (the operator of the VSIM server 102) may establish relationships with a number of cellular service providers, such a reselling relationship or the purchase of a number of telephone numbers and associated provisioning information for resale to subscribers to the VSIM service. This arrangement allows users to establish a service contract with the VSIM service provider and not directly with a particular cellular service provider.

Referring to FIG. 9, the VSIM server 102 further includes or is connected to a database of available cell phone telephone numbers and their associated provisioning information available from the cellular service providers with whom they have a relationship. The telephone numbers may also be offered with a variety of service and billing plans as offered by the providing cellular service provider. The VSIM server 102 and/or the database of available telephone numbers is linked, such as by a network or the Internet, to the OPCs 140, 141 of the cellular service providers so that user registration information can be provided to the OPC and additional telephone and associated provisioning information can be provided to the telephone number database. Otherwise, the architecture of the system is the same for other embodiments as described above with reference to FIGS. 5 and 7.

Referring to FIG. 8, if the VSIM processor 113 determines that the user is new (i.e., does not have an account with the VSIM service provider), the user is prompted to create a new account (step 254) and enter authentication credentials (step 255) which are stored in the authentication database 106 (step 256). Once the authentication credentials are stored in the authentication database 106, the VSIM processor 113 prompts the user to select which service provider the user elects to execute a service contract with, step 257. The VSIM processor 113 may send data or an image to be displayed on the handheld's display 111 informing the user of the service providers available and, optionally, service plans and telephone numbers to choose from. This information is accessed from the telephone number database 126 based upon information provided by different OPCs 140, 141. When a user elects to execute a service contract with a specific service provider, such as by making a selection on the new handheld device in response to a menu option presented on the display 111, the file containing the selected available telephone number and its associated provisioning information for the service provider is retrieved from the telephone number database 126 by the VSIM processor 113, 258. Alternatively, the VSIM server 102 may access the OPC 140 or 141 of the selected service provider and request downloading of the provisioning information. The VSIM server 102 then transmits the provisioning information to the mobile handset, step 259, such as by initiating the restore procedure described above.

If the VSIM processor 113 determines that the user is an existing user with an existing user account stored on the VSIM database 104, the user will be prompted to enter their authentication credentials (step 262). Once the authentication credentials are received via the VSIM server 102, the user will be verified if the entered authentication credentials match the authentication credentials stored within authentication database 106. Once verified, the user may be asked if the user has updated their mobile handset 101 equipment and/or if the user wishes to change their current service provider, step 268. If the answer to either or both questions is yes, the VSIM processor 113 prompts the user to select which service provider the user elects to execute a service contract with, step 257.

As above, the VSIM processor 113 may send data or an image to be displayed on the handheld's display 111 informing the user of the service providers available and, optionally, service plans and telephone numbers to choose from. This information is accessed from the telephone number database 126 based upon information provided by different OPCs 140, 141. When a user elects to execute a service contract with a specific service provider, such as making a selection on the new handheld device in response to a menu option presented on the display 111, the file containing the selected available telephone number and its associated provisioning information for the service provider is retrieved from the telephone number database 126 by the VSIM processor 113, 258. Alternatively, the VSIM server 102 may access the OPC 140 or 141 of the selected service provider and request downloading of the provisioning information. The VSIM server 102 then transmits the provisioning information to the mobile handset, step 259, such as by initiating the restore procedure described above.

In instances where the user has upgraded their mobile handset 101 equipment but elects to use the same service provider, the user simply selects the same service provider as was previously used. The VSIM server 102 may access the OPC 140, 141 to retrieve the full provisioning information. Accordingly, the OPC 140 will be accessed and the provisioning information will be transmitted to the new mobile handset 101, step 259. Once the mobile handset 101 is fully provisioned, the VSIM database 104 may be accessed in step 260 to restore all of the user's personal data stored therein to the new mobile handset 101. After the personal data is restored, the user may log off the VSIM server 102.

If the user elects to use the same service provider and/or has not updated the mobile handset 101 equipment with a new phone, then after the authentication process is complete and the user is verified (step 263), the mobile handset 101 is granted access to the VSIM server 102 (step 260) to either backup, restore or modify the personal data, step 261

By way of the various embodiments, users who lose their mobile handset 101, may simply log in to the VSIM server to deactivate their account to prevent any further unauthorized usage. The log in procedure may be made from any mobile handset so long as the proper account name and authentication credentials are provided. Alternatively, the user may log into the VSIM server via a computer with access to the Internet over a secure Internet link by providing the proper account name and authentication credentials.

Due to the sensitivity of the provisioning and personal data that may be downloaded from the VSIM server 102, additional provisions for authenticating users are desirable. While passwords provide a certain level of protection, passwords are often easy to steal or guess. Biometric authentication provides a more robust form of authentication that may be advantageous for use in the various embodiments. A particular form of biometric authentication is finger print imaging. With the development of compact sensors, this capability can now be fitted into a cellular telephone. FIG. 10 illustrates a mobile handset 101 with a finger print scanner 110 included. A user can enter authentication information simply by sliding a finger over the scanner 110. Referring to FIG. 5, the biometric scanner 110 is coupled to the handset processor 107 so that finger print data can be transmitted to the authentication server 103 via the cellular telephone network as described above.

The hardware used to implement the events of FIGS. 2, 3, 4, 6, and 8 may be processing elements and memory elements configured to execute a set of instructions, wherein the set of instructions are for performing method steps corresponding to the above events. Alternatively, some events may be performed by circuitry that is specific to a given function.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the present invention has been disclosed with reference to certain example embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

We claim:

1. A method for provisioning a mobile handset, comprising:
    storing provisioning information for the mobile handset in a central database;
    receiving via a cellular telephone network an account name and an authentication credential from a user of the mobile handset; and
    downloading the mobile handset provisioning information to the mobile handset using the cellular telephone network,
    wherein the handset provisioning information is automatically downloaded to the mobile handset every time the mobile handset is powered up.

2. The method of claim 1, further comprising authenticating the user based on the received account name and authentication credential prior to downloading the handset provisioning information to the mobile handset.

3. The method of claim 1, wherein the authentication credential comprises an alphanumeric password.

4. The method of claim 1, wherein the authentication credential comprises biometric information.

5. The method of claim 4, further wherein the authentication credential also comprises an alphanumeric password.

6. The method of claim 1, wherein the authentication credential comprises finger print information generated by a finger print scanner.

7. The method of claim 1, wherein the authentication credential comprises a retinal scan generated by a camera capable of scanning the user's retina.

8. The method of claim 1, wherein the authentication credential comprises an image of the user's facial features generated by a camera capable of performing facial recognition.

9. The method of claim 1, wherein the authentication credential comprises a handwriting sample generated by a digital pen and pad.

10. The method of claim 1, wherein the authentication credential comprises a three dimensional scan of a shape and depth of the user's ear canal generated by a three dimensional scanning sensor.

11. The method of claim 1, wherein the authentication credential comprises a spoken phrase suitable for a voice print comparison.

12. The method of claim 1, further comprising:
storing the user's personal data for the mobile handset in the central database; and
downloading the user's personal data to the mobile handset using the cellular telephone network.

13. The method of claim 1, wherein the central database is a VSIM database coupled to a server, and the server is configured to receive and transmit data via the cellular telephone network.

14. The method of claim 2, wherein authenticating the user is accomplished by an authentication server.

15. The method of claim 1, further comprising accessing at least one operator provisioning center which contains provisioning information.

16. The method of claim 1, wherein the central database contains provisioning information for a plurality of cellular telephone service providers.

17. The method of claim 1, further comprising requesting the user to select one service provider from a selection of multiple service providers.

18. The method of claim 17, wherein downloading the mobile handset provisioning information downloads provisioning information from the selected service provider to the mobile handset.

19. A method for restoring personal data for use in a user's mobile handset, comprising:
requesting the user to enter an authentication credential into the mobile handset every time the mobile handset is powered up;
receiving the entered authentication credentials at an authentication server via a cellular telephone network;
authenticating the user if the entered authentication credential matches an authentication credential previously stored in an authentication database;
granting access to personal data previously stored in a VSIM database if the user is authenticated; and
transmitting personal data to the user's mobile handset for storage in an internal memory of the mobile handset,
wherein the user's personal data is automatically transmitted every time the mobile handset is powered up.

20. The method of claim 19, further comprising storing mobile handset provisioning information in a server accessible by a mobile handset; and
downloading the handset provisioning information to the mobile handset using the cellular telephone network.

21. The method of claim 20, wherein the user is authenticated prior to downloading provisioning information and personal data.

22. The method of claim 19, wherein requesting the user to enter an authentication credential comprises requesting the user to perform an act that generates biometric data.

23. The method of claim 19, wherein requesting the user to enter an authentication credential comprises requesting the user to key in an alphanumeric password.

24. The method of claim 22, further wherein requesting the user to enter an authentication credential further comprises requesting the user to key in an alphanumeric password.

25. The method of claim 22, wherein said act requires the user to swipe a finger over a fingerprint sensor.

26. The method of claim 22, further wherein said act requires the user to record a voice recognition sample.

27. The method of claim 22, further wherein said act requires the user to provide a retinal scan.

28. The method of claim 22, further wherein said act requires the user to provide a facial image.

29. The method of claim 22, further wherein said act requires the user to provide a handwriting sample.

30. The method of claim 22, further wherein said act is a scan of the user's ear canal.

31. A method for preserving personal data for use in a user's mobile handset, comprising:
requesting the user to enter an authentication credential into the mobile handset every time the mobile handset is powered up;
receiving the entered authentication credential at an authentication server via a cellular telephone network;
authenticating the user if the entered authentication credential matches an authentication credential previously stored in an authentication database;
granting the user access to modify personal data stored in a VSIM database if the user is authenticated;
receiving personal data from the user's mobile handset via the cellular telephone network; and
storing the received personal data to a VSIM database,
wherein the user's personal data is automatically preserved every time the mobile handset is powered up.

32. The method of claim 31, wherein authenticating the user is performed by an authentication server.

33. The method of claim 31, wherein requesting the user to enter an authentication credential comprises requesting the user to perform an act that generates biometric data.

34. The method of claim 31, wherein requesting the user to enter an authentication credential comprises requesting the user to key in an alphanumeric password.

35. The method of claim 31, wherein requesting the user to enter an authentication credential further comprises requesting the user to key in an alphanumeric password.

36. The method of claim 33, wherein said act requires the user to swipe a finger over a fingerprint sensor.

37. The method of claim 33, further wherein said act requires a user to record a voice recognition sample.

38. The method of claim 33, further wherein said act requires a user to provide a retinal scan.

39. The method of claim 33, further wherein said act requires the user to provide a facial image.

40. The method of claim 33, further wherein said act requires the user to provide a handwriting sample.

41. The method of claim 33, further wherein said act requires the user to provide a scan of the user's ear canal.

42. The method of claim 31, wherein the user's personal data is automatically stored in the VSIM database each time the user modifies the personal data stored in the internal memory of the mobile handset.

43. The method of claim 31, wherein the user's personal data is automatically preserved at a preset interval.

44. A non-transitory computer readable medium having stored thereon computer executable instructions for restoring personal data to a user's mobile handset, the computer executable instructions configured to cause a server to perform steps comprising:
requesting the user to enter an authentication credential into the mobile handset upon power up of the handset;
receiving the entered authentication credential via a cellular telephone network and providing the entered authentication credential at an authentication server;
granting access to personal data previously stored in a VSIM database if the user is authenticated by the authentication server; and
automatically transmitting via the cellular telephone network personal data to the user's mobile handset for storage in an internal memory of the mobile handset every time the mobile handset is powered up.

45. The non-transitory computer readable medium of claim 44, wherein the computer executable instructions further comprise instructions to cause the server to:
store mobile handset provisioning information; and
download the handset provisioning information to the mobile handset using the cellular telephone network every time the mobile handset is powered up.

46. The non-transitory computer readable medium of claim 44, wherein the computer executable instructions further comprise instructions to cause the server to request the user to perform an act that generates biometric data.

47. The non-transitory computer readable medium of claim 44, wherein the computer executable instructions further comprise instructions to cause the server to request the user to key in an alphanumeric password.

48. The non-transitory computer readable medium of claim 46, wherein the computer executable instructions further comprise instructions to further cause the server to request the user to key in an alphanumeric password.

49. The non-transitory computer readable medium of claim 44, wherein the computer executable instructions further comprise instructions to cause the server to request the user to swipe a finger over a fingerprint sensor.

50. The non-transitory computer readable medium of claim 44, wherein the computer executable instructions further comprise instructions to cause the server to request the user to record a voice recognition sample.

51. The non-transitory computer readable medium of claim 44, wherein the computer executable instructions further comprise instructions to cause the server to request the user to provide a retinal scan.

52. The non-transitory computer readable medium of claim 44, wherein the computer executable instructions further comprise instructions to cause the server to request the user to provide a facial recognition image.

53. The non-transitory computer readable medium of claim 44, wherein the computer executable instructions further comprise instructions to cause the server to request the user to provide a handwriting sample.

54. The non-transitory computer readable medium of claim 44, wherein the computer executable instructions further comprise instructions to cause the server to request the user to provide a scan of the user's ear canal.

55. The non-transitory computer readable medium of claim 44, wherein the computer executable instructions further comprise instructions to request the user to cause the server to perform steps comprising:
receiving via the cellular telephone network personal data from the user's mobile handset; and
storing the received personal data to a VSIM database.

56. A system for transferring and preserving personal data for use in a user's mobile handset, comprising:
a mobile handset having an internal memory, wherein the mobile handset is configured to access the internal memory for provisioning and user personal data;
a VSIM server having a VSIM processor, wherein the VSIM server is configured to be accessible by the mobile handset via a cellular telephone network;
a VSIM database in communication with the VSIM server, wherein the VSIM database is configured to store provisioning and personal data for use on the mobile handset;
an authentication server having an authentication processor in communication with the VSIM server; and
an authentication database in communication with the authentication server, wherein the VSIM server is configured to:
receive from a user authentication information sent by the mobile handset via the cellular telephone network every time the mobile handset is powered up; and
grant the user access to personal data in the VSIM database if the user is authenticated by the authentication processor.

57. The system of claim 56, wherein the VSIM server is further configured to store mobile handset provisioning information in at least one operator provisioning server accessible by a mobile handset, and download the provisioning data to the mobile handset using the cellular telephone network every time the mobile handset is powered up.

58. The system of claim 56, wherein the VSIM server is further configured to download the provisioning data to the mobile handset using the cellular telephone network every time the mobile handset is powered up.

59. The system of claim 56 wherein:
the VSIM server is further configured to receive from the mobile handset via the cellular telephone network user personal data stored in the internal memory of the mobile handset; and
the mobile handset is configured to transmit to the VSIM server via the cellular telephone network user personal data stored in the internal memory.

60. The system of claim 56, wherein:
the VSIM server is further configured to transmit to the mobile handset via the cellular telephone network user personal data for storage in the internal memory of the mobile handset; and
the mobile handset is configured to receive user personal data from the VSIM server via the cellular telephone network and to store the received user personal data in the internal memory.

61. The system of claim 56, wherein the mobile handset further comprises a biometric sensor, and the authentication server is configured to authenticate a user based upon biometric information.

62. The system of claim 56, wherein the mobile handset further comprises a keypad, and the authentication server is configured to authenticate a user based upon an alphanumeric password.

63. The system of claim 61, wherein the mobile handset further comprises a keypad, and the authentication server is further configured to authenticate a user based upon said biometric information and an alphanumeric password.

64. The system of claim 61, further wherein said biometric sensor is a fingerprint sensor, and the authentication server is configured to authenticate a user based upon finger print information provided by the fingerprint sensor.

65. The system of claim 61, further wherein said biometric sensor is a voice recognition recorder, and the authentication server is configured to authenticate a user based upon recorded voice information provided by the voice recognition recorder.

66. The system of claim 61, further wherein said biometric sensor is a retinal scan sensor, and the authentication server is configured to authenticate a user based upon retinal scan information provided by the retinal scan sensor.

67. The system of claim 61, further wherein said biometric sensor is a camera, and the authentication server is configured to authenticate a user based upon recognition of facial features in an image provided by the camera.

68. The system of claim 61, further wherein said biometric sensor is a digital pen and pad, and the authentication server is configured to authenticate a user based upon a handwriting sample provided by the digital pen and pad.

69. The system of claim 61, further wherein said biometric sensor is a three dimensional scanner sensor, and the authentication server is configured to authenticate a user based the depth and shape of the user's ear canal provided by the three dimensional scanner sensor.

70. The system of claim 56, wherein the at least one operator provisioning center server contains provisioning information for a plurality of service providers.

71. The system of claim 70, wherein the VSIM server contains provisioning information for a plurality of service providers.

72. The system of claim 70, further comprising a plurality of operator provisioning centers in communication with the VSIM server.

73. The system of claim 72, wherein each of said plurality of operator provisioning centers contains provisioning information for a different service provider.

74. A non-transitory computer readable medium having stored therein software instructions executable on a cellular telephone processor and configured to cause the processor to perform steps comprising:
   transmitting an authentication credential to an external server via a cellular telephone network every time the mobile handset is powered up;
   automatically receiving provisioning information via the cellular telephone network upon successful authentication;
   storing the received provisioning information in an internal memory unit; and
   using the provisioning data stored in the memory unit for placing and receiving calls from the cellular telephone network.

75. The non-transitory computer readable medium of claim 74, wherein the stored software instructions are configured to cause the processor to further perform the steps of:
   receiving biometric data from a biometric sensor; and
   transferring the received biometric data to an external server via the cellular data network.

76. The non-transitory computer readable medium of claim 75, wherein the stored software instructions are configured to cause the processor to further perform the steps of:
   receiving a request for user authentication data via the cellular telephone network; and
   prompting a user to use the biometric sensor to generate the biometric data in response to receiving the request for user authentication data.

77. The non-transitory computer readable medium of claim 74, wherein the stored software instructions are configured to cause the processor to further perform the step of transmitting personal data stored in memory to the external server via the cellular data network.

78. The non-transitory computer readable medium of claim 74, wherein the stored software instructions are configured to cause the processor to further perform the step of transmitting personal data stored in memory to the external server via the cellular data network when the personal data is modified by a user.

79. The non-transitory computer readable medium of claim 74, wherein the stored software instructions are configured to cause the processor to further perform the step of transmitting personal data stored in memory to the external server via the cellular data network at predetermined intervals.

80. The non-transitory computer readable medium of claim 74, wherein the stored software instructions are configured to cause the processor to further perform the step of transmitting personal data stored in memory to the external server via the cellular data network when prompted to do so by a user.

81. The non-transitory computer readable medium of claim 74, wherein the received personal data comprises a phonebook and the stored software instructions are configured to cause the processor to further perform the step of providing phonebook functionality using the personal data stored in memory.

82. The non-transitory computer readable medium of claim 74, wherein the received personal data comprises a ring tone and the stored software instructions are configured to cause the processor to further perform the step of using the ring tone in the personal data stored in memory.

83. The non-transitory computer readable medium of claim 74, wherein the received personal data comprises a wall paper and the stored software instructions are configured to cause the processor to further perform the step of using the wall paper in the personal data stored in memory.

* * * * *